(12) United States Patent
Steinberg et al.

(10) Patent No.: US 8,131,497 B2
(45) Date of Patent: *Mar. 6, 2012

(54) SYSTEM AND METHOD FOR CALCULATING THE THERMAL MASS OF A BUILDING

(75) Inventors: John Douglas Steinberg, Millbrae, CA (US); Scott Douglas Hublou, Redwood City, CA (US)

(73) Assignee: EcoFactor, Inc., Millbrae, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/959,225

(22) Filed: Dec. 2, 2010

(65) Prior Publication Data

US 2011/0077896 A1 Mar. 31, 2011

Related U.S. Application Data

(63) Continuation of application No. 12/211,733, filed on Sep. 16, 2008, now Pat. No. 7,848,900.

(60) Provisional application No. 60/994,011, filed on Sep. 17, 2007.

(51) Int. Cl.
G01K 9/00 (2006.01)
(52) U.S. Cl. ........................................ 702/130; 702/182
(58) Field of Classification Search .................. 702/130, 702/182; 700/276, 277, 278; 236/91 D; 165/58, 200, 287
See application file for complete search history.

(56) References Cited

U.S. PATENT DOCUMENTS

| | | | |
|---|---|---|---|
| 4,136,732 A | 1/1979 | Demaray et al. | |
| 4,341,345 A | 7/1982 | Hammer et al. | |
| 4,403,644 A | 9/1983 | Hebert | |
| 4,655,279 A | 4/1987 | Harmon | |
| 4,674,027 A | 6/1987 | Beckey | |
| 5,244,146 A | 9/1993 | Jefferson et al. | |
| 5,270,952 A | 12/1993 | Adams et al. | |
| 5,314,004 A | 5/1994 | Strand et al. | |
| 5,462,225 A | 10/1995 | Massara et al. | |
| 5,544,036 A | 8/1996 | Brown et al. | |
| 5,555,927 A | 9/1996 | Shah | |
| 5,572,438 A | 11/1996 | Ehlers et al. | |
| 5,717,609 A | 2/1998 | Packa et al. | |
| 6,145,751 A | 11/2000 | Ahmed | |
| 6,178,362 B1 | 1/2001 | Woolard et al. | |
| 6,260,765 B1 | 7/2001 | Natale et al. | |

(Continued)

OTHER PUBLICATIONS

Arens, et al., "How Ambient Intelligence Will Improve Habitability and Energy Efficiency in Buildings", 2005, research paper, Center for the Built Environment, Controls and Information Technology.

(Continued)

*Primary Examiner* — Edward Raymond
*Assistant Examiner* — Elias Desta
(74) *Attorney, Agent, or Firm* — Knobbe, Martens, Olson & Bear, LLP

(57) ABSTRACT

The invention comprises a system for calculating a value for the effective thermal mass of a building. The climate control system obtains temperature measurements from at least a first location conditioned by the climate system. One or more processors receive measurements of outside temperatures from at least one source other than the control system and compare the temperature measurements from the first location with expected temperature measurements. The expected temperature measurements are based at least in part upon past temperature measurements obtained by said HVAC control system and said outside temperature measurements. The processors then calculate one or more rates of change in temperature at said first location.

12 Claims, 13 Drawing Sheets

U.S. PATENT DOCUMENTS

| | | |
|---|---|---|
| 6,351,693 B1 | 2/2002 | Monie |
| 6,400,996 B1 | 6/2002 | Hoffberg et al. |
| 6,437,692 B1 | 8/2002 | Petite et al. |
| 6,478,233 B1 | 11/2002 | Shah |
| 6,480,803 B1 | 11/2002 | Pierret et al. |
| 6,483,906 B1 | 11/2002 | Lggulden et al. |
| 6,536,675 B1 | 3/2003 | Pesko et al. |
| 6,542,076 B1 | 4/2003 | Joao |
| 6,549,130 B1 | 4/2003 | Joao |
| 6,574,537 B2 | 6/2003 | Kipersztok et al. |
| 6,580,950 B1 | 6/2003 | Johnson |
| 6,594,825 B1 | 7/2003 | Goldschmidtlki et al. |
| 6,595,430 B1 | 7/2003 | Shah |
| 6,598,056 B1 | 7/2003 | Hull et al. |
| 6,619,555 B2 | 9/2003 | Rosen |
| 6,622,097 B2 | 9/2003 | Hunter |
| 6,622,115 B1 | 9/2003 | Brown et al. |
| 6,622,925 B2 | 9/2003 | Carner et al. |
| 6,622,926 B1 | 9/2003 | Sartain et al. |
| 6,628,997 B1 | 9/2003 | Fox et al. |
| 6,633,823 B2 | 10/2003 | Bartone et al. |
| 6,643,567 B2 | 11/2003 | Kolk et al. |
| 6,671,586 B2 | 12/2003 | Davis et al. |
| 6,695,218 B2 | 2/2004 | Fleckenstein |
| 6,726,113 B2 | 4/2004 | Guo |
| 6,731,992 B1 | 5/2004 | Ziegler |
| 6,734,806 B1 | 5/2004 | Cratsley |
| 6,772,052 B1 | 8/2004 | Amundsen |
| 6,785,592 B1 * | 8/2004 | Smith et al. ............ 700/291 |
| 6,785,630 B2 | 8/2004 | Kolk |
| 6,789,739 B2 | 9/2004 | Rosen |
| 6,853,959 B2 | 2/2005 | Ikeda et al. |
| 6,868,293 B1 | 3/2005 | Schurr |
| 6,868,319 B2 | 3/2005 | Kipersztok et al. |
| 6,882,712 B1 | 4/2005 | Iggulden et al. |
| 6,889,908 B2 | 5/2005 | Crippen et al. |
| 6,891,838 B1 | 5/2005 | Petite et al. |
| 6,991,029 B2 | 1/2006 | Orfield et al. |
| 7,009,493 B2 | 3/2006 | Howard et al. |
| 7,031,880 B1 | 4/2006 | Seem et al. |
| 7,039,532 B2 | 5/2006 | Hunter |
| 7,089,088 B2 | 8/2006 | Terry et al. |
| 7,130,719 B2 | 10/2006 | Ehlers et al. |
| 7,130,832 B2 | 10/2006 | Bannai et al. |
| 7,167,079 B2 | 1/2007 | Smyth et al. |
| 7,187,986 B2 | 3/2007 | Johnson et al. |
| 7,205,892 B2 | 4/2007 | Luebke et al. |
| 7,215,746 B2 | 5/2007 | Iggulden et al. |
| 7,216,015 B2 | 5/2007 | Poth |
| 7,231,424 B2 | 6/2007 | Bodin et al. |
| 7,232,075 B1 | 6/2007 | Rosen |
| 7,356,384 B2 | 4/2008 | Gull et al. |
| 7,644,869 B2 | 1/2010 | Hoglund et al. |
| 7,784,704 B2 | 8/2010 | Harter |
| 7,848,900 B2 * | 12/2010 | Steinberg et al. ............ 702/130 |
| 7,894,943 B2 | 2/2011 | Sloup et al. |
| 2003/0040934 A1 | 2/2003 | Skidmore et al. |
| 2005/0222889 A1 | 10/2005 | Lai et al. |
| 2005/0288822 A1 | 12/2005 | Rayburn |
| 2007/0043477 A1 | 2/2007 | Elhers et al. |
| 2008/0083234 A1 | 4/2008 | Krebs et al. |
| 2009/0099699 A1 | 4/2009 | Steinberg et al. |
| 2009/0125151 A1 | 5/2009 | Steinberg et al. |
| 2009/0240381 A1 | 9/2009 | Lane |
| 2009/0281667 A1 | 11/2009 | Masui et al. |
| 2010/0019052 A1 | 1/2010 | Yip |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0211224 A1 | 8/2010 | Keeling et al. |
| 2010/0235004 A1 | 9/2010 | Thind |
| 2010/0289643 A1 | 11/2010 | Trundle et al. |
| 2011/0031323 A1 | 2/2011 | Nold et al. |

OTHER PUBLICATIONS

Honeywell, W7600/W7620 Controller Reference Manual, HW0021207, Oct. 1992.

Johnson Controls, Touch4 building automation system brochure, 2007.

Kilicotte, et al., "Dynamic Controls for Energy Efficiency and Demand Response: Framework Concepts and a New Construction Study Case in New York", Proceedings of the 2006 ACEEE Summer Study of Energy Efficiency in Buildings, Pacific Grove. CA, Aug. 13-18, 2006.

Lin, et al., "Multi-Sensor Single-Actuator Control of HVAC Systems", 2002.

Wang, et al., "Opportunities to Save Energy and Improve Comfort by Using Wireless Sensor Networks in Buildings," (2003), Center for Environmental Design Research.

Wetter, et al., A comparison of deterministic and probabilistic optimization algorithms for nonsmooth simulation-based optimization., Building and Environment 39, 2004, pp. 989-999.

* cited by examiner

SYSTEM AND METHOD FOR CALCULATING THE THERMAL MASS OF A BUILDING

CROSS-REFERENCE TO RELATED APPLICATIONS

This application is a continuation of U.S. patent application No. 12/211,733, filed Sept. 16, 2008 which claims priority under 35 U.S.C. §119(e) to U.S. Provisional Application No. 60/994,011, filed Sept. 17, 2007, the entirety of each of which is hereby incorporated herein by reference and is to be considered part of this specification.

BACKGROUND OF THE INVENTION

1. Field of the Invention

This invention relates to the use of thermostatic HVAC controls that are connected to a computer network. More specifically, communicating thermostats are combined with a computer network to calculate the thermal mass of a structure.

2. Background

Climate control systems such as heating and cooling systems for buildings (heating, ventilation and cooling, or HVAC systems) have been controlled for decades by thermostats. At the most basic level, a thermostat includes a means to allow a user to set a desired temperature, a means to sense actual temperature, and a means to signal the heating and/or cooling devices to turn on or off in order to try to change the actual temperature to equal the desired temperature. The most basic versions of thermostats use components such as a coiled bi-metallic spring to measure actual temperature and a mercury switch that opens or completes a circuit when the spring coils or uncoils with temperature changes. More recently, electronic digital thermostats have become prevalent. These thermostats use solid-state devices such as thermistors or thermal diodes to measure temperature, and microprocessor-based circuitry to control the switch and to store and operate based upon user-determined protocols for temperature vs. time.

These programmable thermostats generally offer a very restrictive user interface, limited by the cost of the devices, the limited real estate of the small wall-mounted boxes, and the inability to take into account more than two variables: the desired temperature set by the user, and the ambient temperature sensed by the thermostat. Users can generally only set one series of commands per day, and in order to change one parameter (e.g., to change the late-night temperature) the user often has to cycle through several other parameters by repeatedly pressing one or two buttons.

Because the interface of programmable thermostats is so poor, the significant theoretical savings that are possible with them (sometimes cited as 25% of heating and cooling costs) are rarely realized. In practice, studies have fund that more than 50% of users never program their thermostats at all. Significant percentages of the thermostats that are programmed are programmed sub-optimally, in part because, once programmed, people tend to not to re-invest the time needed to change the settings very often.

A second problem with standard programmable thermostats is that they represent only a small evolutionary step beyond the first, purely mechanical thermostats. Like the first thermostats, they only have two input signals—ambient temperature and the preset desired temperature. The entire advance with programmable thermostats is that they can shift between multiple present temperatures at different times.

SUMMARY OF THE INVENTION

There are many other sources of information that could be used to increase comfort, decrease energy use, or both. For example, outside temperature and humidity strongly affect subjective comfort. On a 95 degree, 90 percent humidity day in August, when people tend to dress in lightweight clothing, a house cooled to 70 degrees will feel cool or even uncomfortably cold. On a below-freezing day in January, when people tend to wear sweaters and heavier clothes, that same 70 degree home will feel too warm. It would therefore be advantageous for a thermostat system to automatically incorporate information about external weather conditions when setting the desired temperature.

Thermostats are used to regulate temperature for the benefit of the occupants in a given space. (Usually this means people, but it can of course also mean critical equipment, such as in a room filled with computer equipment.) In general, thermostats read temperature from the sensor located within the "four corners" of the thermostat. With a properly designed system, the thermostat may well be located such that the temperature read at the precise location of the thermostat accurately reflects the conditions where the human (or other) occupants tend to be. But there are many reasons and circumstances in which that will not be the case. A single thermostat may produce accurate readings in some circumstances but not others; it may be located in a place far from the occupants, or too far from the ductwork controlled by the thermostat, etc. In one house, for example, the thermostat may be located in a spot that receives direct sunlight on hot afternoons. This could cause the thermostat to sense that the local ambient temperature is extremely high, and as a result signal the A/C to run too long, making the rest of the home too cold, and wasting considerable energy. In another house, the thermostat may be located in a hallway without ductwork or where the nearby ducts have been closed. In such a scenario, the thermostat is likely to (correctly) report cold temperatures in the winter, leading the heating system to overheat the rest of the house and waste considerable energy.

These problems can be reduced or eliminated through use of additional remote temperature sensors connected to the thermostat's control circuitry. However, such systems require additional hardware, additional thermostat complexity, and skilled installation and configuration.

It would therefore be desirable for a thermostat system using only a single temperature sensor to take such sub-optimal installations into account and to correct for the erroneous readings generated by such thermostats.

Different structures will respond to changes in conditions such as external temperature in different ways. For example, houses built 50 or more years ago will generally have little or no insulation, be poorly sealed, and have simple single-glazed windows. Such houses will do a very poor job of retaining internal heat in the winter and rejecting external heat in the summer. In the absence of applications of thermal measures such as heating and air conditioning, the inside temperature in such houses will trend to track outside temperatures very closely. Such houses may be said to have low thermal mass. A house built in recent years, using contemporary techniques for energy efficiency such as high levels of insulation, double-glazed windows and other techniques, will, in the absence of intervention, tend to absorb external heat and release internal heat very slowly. The newer house can be thought of as having higher thermal mass than the older house.

A conventional thermostat has no mechanism by which it might take the thermal mass of the structure into account, but thermal mass significantly affects many parameters relating to energy efficiency.

The cost to an electric utility to produce power varies over time. Indeed, the cost of production between low demand and peak demand periods can vary by as much as an order of magnitude. Traditionally, residential customers paid the same price regardless of time or the cost to produce. Thus consumers have had little financial incentive to reduce consumption during periods of high demand and high production cost. Many electric utilities are now seeking to bring various forms of variable rates to the retail energy markets. Under such schemes, consumers can reduce costs by taking into account not just how much energy they use, but when they use it.

Thus many consumers now can see real benefits from optimizing not just the total number of kilowatt-hours of electricity consumed, but also optimizing when it is used. The optimum strategy for energy use over time will vary based upon many variables, one of which is the thermal mass of the structure being heated or cooled. In a structure with high thermal mass, heating and cooling can effectively be shifted away from high cost periods to lower cost "shoulder" periods with little or no effect on comfort. If, for example, a utility charges much higher rates on hot summer afternoons, it is likely that pre-cooling a high-thermal mass structure just before the high-cost period and then shutting down the air conditioning during the peak will allow the house to remain comfortable. But in a house with low thermal mass, the benefits of pre-cooling will quickly dissipate, and the house will rapidly become uncomfortable if the air conditioning is shut off. Thus it would be advantageous for a temperature control system to take thermal mass into account when setting desired temperatures.

Many factors affect the efficiency of HVAC systems. Some may be thought of as essentially fixed, such as the theoretical efficiency of a central air conditioner (often expressed as its SEER rating), the matching of a given system to the characteristics of a given home, the location and size of forced-air ductwork, etc. Other contributors to efficiency are more dynamic, such as clogged filters, refrigerant leaks, duct leakage and "pop-offs," and the like.

Most of these problems are likely to manifest themselves in the form of higher energy bills. But the "signature" of each different problem can be discerned from the way in which each such problem affects the cycle times of a given HVAC system over time and relative to weather conditions and the performance of other HVAC systems in other houses. If two otherwise identical houses are located next door to each other and have gas furnaces, but one is rated at 50,000 BTUs and the other is rated at 100,000 BTUs, the cycle times for the higher-capacity furnace should be shorter than for the lower-capacity unit. If both of those same houses have identical furnaces, but one has a clogged filter, the cycle times should be longer in the house with the clogged filter. Because cycling of the HVAC system is controlled by the thermostat, those differences in cycle time would be reflected in the data sensed by and control signals generated by the thermostat. It would be advantageous for a thermostat system to be able to use that information to diagnose problems and make recommendations based upon that data.

These needs are satisfied by at least one embodiment of the invention that includes a system for calculating a value for the effective thermal mass of a building comprising: at least one HVAC control system that measures temperature at least a first location conditioned by said HVAC system, and reporting said temperature measurements as well as the status of said HVAC control system; one or more processors that receive measurements of outside temperatures from at least one source other than said HVAC control systems and compare said temperature measurements from said first location with expected temperature measurements wherein the expected temperature measurements are based at least in part upon past temperature measurements obtained by said HVAC control system and said outside temperature measurements; and one or more databases that store at least said temperatures measured at said first location over time; calculating one or more rates of change in temperature at said first location; and relating said calculated rates of change to said outside temperature measurements.

Another embodiment includes a system for calculating a value for the operational efficiency of an HVAC system comprising at least one HVAC control system that measures temperature at least a first location conditioned by said HVAC system, and reporting said temperature measurements as well as the status of said HVAC control system; one or more processors that receive measurements of outside temperatures from at least one source other than said HVAC control systems and compare said temperature measurements from said first location with expected temperature measurements wherein the expected temperature measurements are based at least in part upon past temperature measurements obtained by said HVAC control system and said outside temperature measurements; and one or more databases that store at least said temperatures measured at said first location over time; calculating one or more rates of change in temperature at said first location for periods during which the status of the HVAC system is "on"; calculating one or more rates of change in temperature at said first location for periods during which the status of the HVAC system is "off"; and relating said calculated rates of" change to said outside temperature measurements.

A further embodiment includes a system for evaluating changes in the operational efficiency of an HVAC system over time comprising at least one HVAC control system that measures temperature at least a first location conditioned by said HVAC system, and reporting said temperature measurements as well as the status of said HVAC control system; one or more processors that receive measurements of outside temperatures from at least one source other than said HVAC control systems and compare said temperature measurements from said first location with expected temperature measurements wherein the expected temperature measurements are based at least in part upon past temperature measurements obtained by said HVAC control system and said outside temperature measurements; and one or more databases that store at least said temperatures measured at said first location over time.

A further embodiment includes a system for detecting and correcting for anomalous behavior in HVAC control systems comprising a first HVAC control system that measures temperature at least a first location conditioned by said first HVAC system, and reporting said temperature measurements as well as the status of said first HVAC control system; at least a second HVAC control system that measures temperature at least a second location conditioned by said second HVAC system, and reporting said temperature measurements as well as the status of said second HVAC control system; one or more processors that receive measurements of outside temperatures from at least one source other than said first and second HVAC control systems and compare said temperature measurements from said first HVAC controls system and said second HVAC control system and said outside temperature measurements; and one or more databases that store said temperatures measurements.

In at least one embodiment, the invention comprises a thermostat attached to an HVAC system, a local network connecting the thermostat to a larger network such as the Internet, and one or more additional thermostats attached to the network, and a server in bi-directional communication with a plurality of such thermostats. The server logs the ambient temperature sensed by each thermostat vs. time and the signals sent by the thermostats to their HVAC systems. The server preferably also logs outside temperature and humidity data for the geographic locations for the buildings served by the connected HVAC systems. Such information is widely available from various sources that publish detailed weather information based on geographic areas such as by ZIP code. The server also stores other data affecting the load upon the system, such as specific model of HVAC system, occupancy, building characteristics, etc. Some of this data may be supplied by the individual users of the system, while other data may come from third-party sources such as the electric and other utilities who supply energy to those users.

Combining these data sources will also allow the server to calculate the effective thermal mass of the structures conditioned by those thermostats. By combining data from multiple thermostats in a given neighborhood, the system can correct for flaws in the location of a given thermostat, and can evaluate the efficiency of a given system, as well as assist in the diagnosis of problems and malfunctions in such systems.

This and other advantages of, certain embodiments of the invention are explained in the detailed description and claims that make reference to the accompanying diagrams and flowcharts.

DETAILED DESCRIPTION OF THE PREFERRED EMBODIMENT

Figure 1:
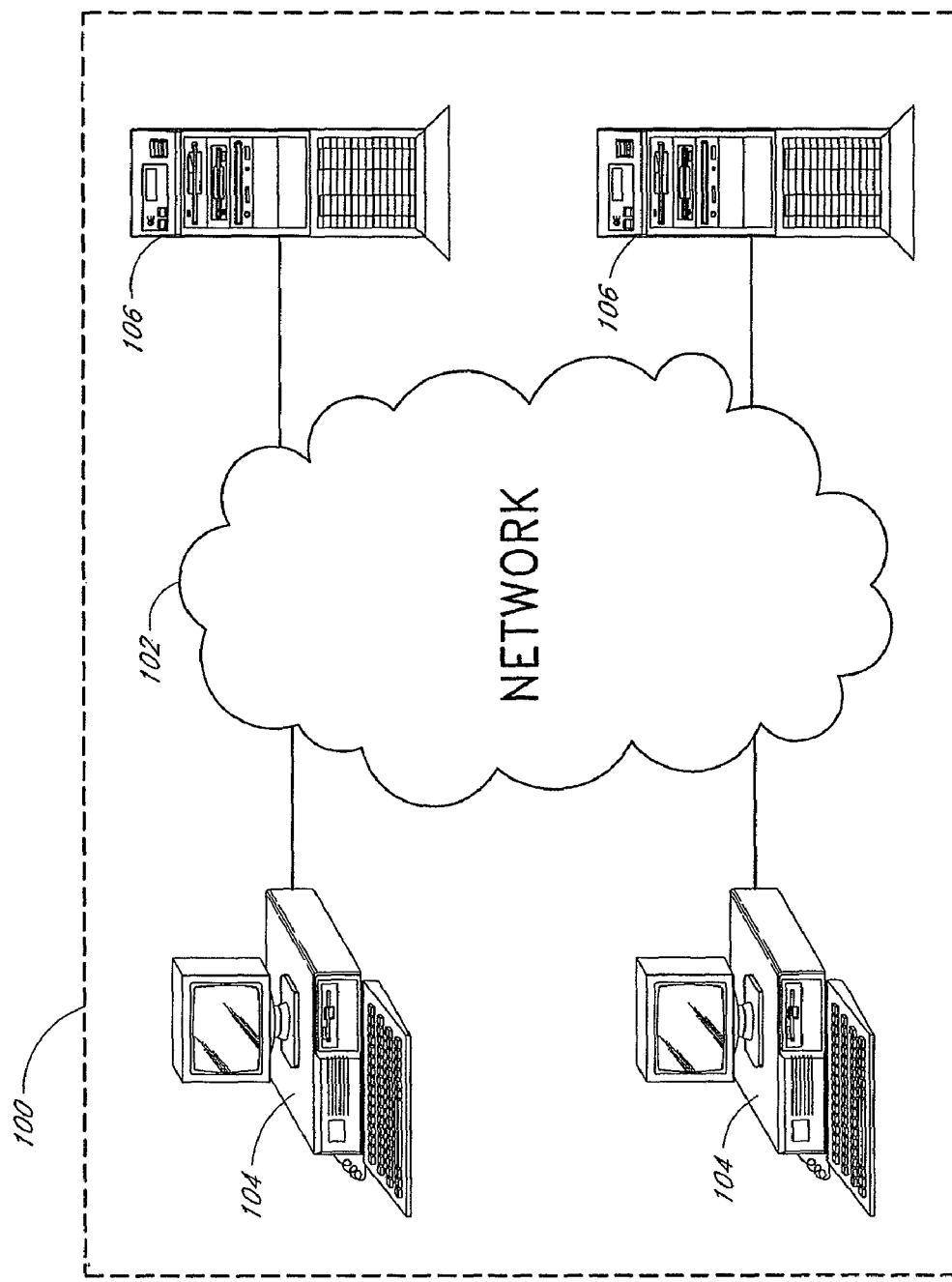
FIG. 1 shows an example of an overall environment in which an embodiment of the invention may be used.

FIG. 1 shows an example of an overall environment 100 in which an embodiment of the invention may be used. The environment 100 includes an interactive communication network 102 with computers 104 connected thereto. Also connected to network 102 are one or more server computers 106, which store information and make the information available to computers 104. The network 102 allows communication between and among the computers 104 and 106.

Presently preferred network 102 comprises a collection of interconnected public and/or private networks that are linked to together by a set of standard protocols to form a distributed network. While network 102 is intended to refer to what is now commonly referred to as the Internet, it is also intended to encompass variations which may be made in the future, including changes additions to existing standard protocols.

When a user of the subject invention wishes to access information on network 102, the buyer initiates connection from his computer 104. For example, the user invokes a browser, which executes on computer 104. The browser, in turn, establishes a communication link with network 102. Once connected to network 102, the user can direct the browser to access information on server 106.

One popular part of the Internet is the World Wide Web. The World Wide Web contains a large number of computers 104 and servers 106, which store HyperText Markup Language (HTML) documents capable of displaying graphical and textual information. HTML is a standard coding convention and set of codes for attaching presentation and linking attributes to informational content within documents.

The servers 106 that provide offerings on the World Wide Web are typically called websites. A website is often defined by an Internet address that has an associated electronic page. Generally, an electronic page is a document that organizes the presentation of text graphical images, audio and video.

In addition to the Internet, the network 102 can comprise a wide variety of interactive communication media. For example, network 102 can include local area networks, interactive television networks, telephone networks, wireless data systems, two-way cable systems, and the like.

In one embodiment, computers 104 and servers 106 are conventional computers that are equipped with communications hardware such as modem or a network interface card. The computers include processors such as those sold by Intel and AMD. Other processors may also be used, including general-purpose processors, multi-chip processors, embedded processors and the like.

Computers 104 can also be handheld and wireless devices such as personal digital assistants (PDAs), cellular telephones and other devices capable of accessing the network.

Computers 104 utilize a browser configured to interact with the World Wide Web. Such browsers may include Microsoft Explorer, Mozilla, Firefox, Opera or Safari. They may also include browsers used on handheld and wireless devices.

The storage medium may comprise any method of storing information. It may comprise random access memory (RAM), electronically erasable programmable read only memory (EEPROM), read only memory (ROM), hard disk, floppy disk, CD-ROM, optical memory, or other method of storing data.

Computers 104 and 106 may use an operating system such as Microsoft Windows, Apple Mac OS, Linux, Unix or the like.

Computers 106 may include a range of devices that provide information, sound, graphics and text, and may use a variety of operating systems and software optimized for distribution of content via networks.

Figure 2:
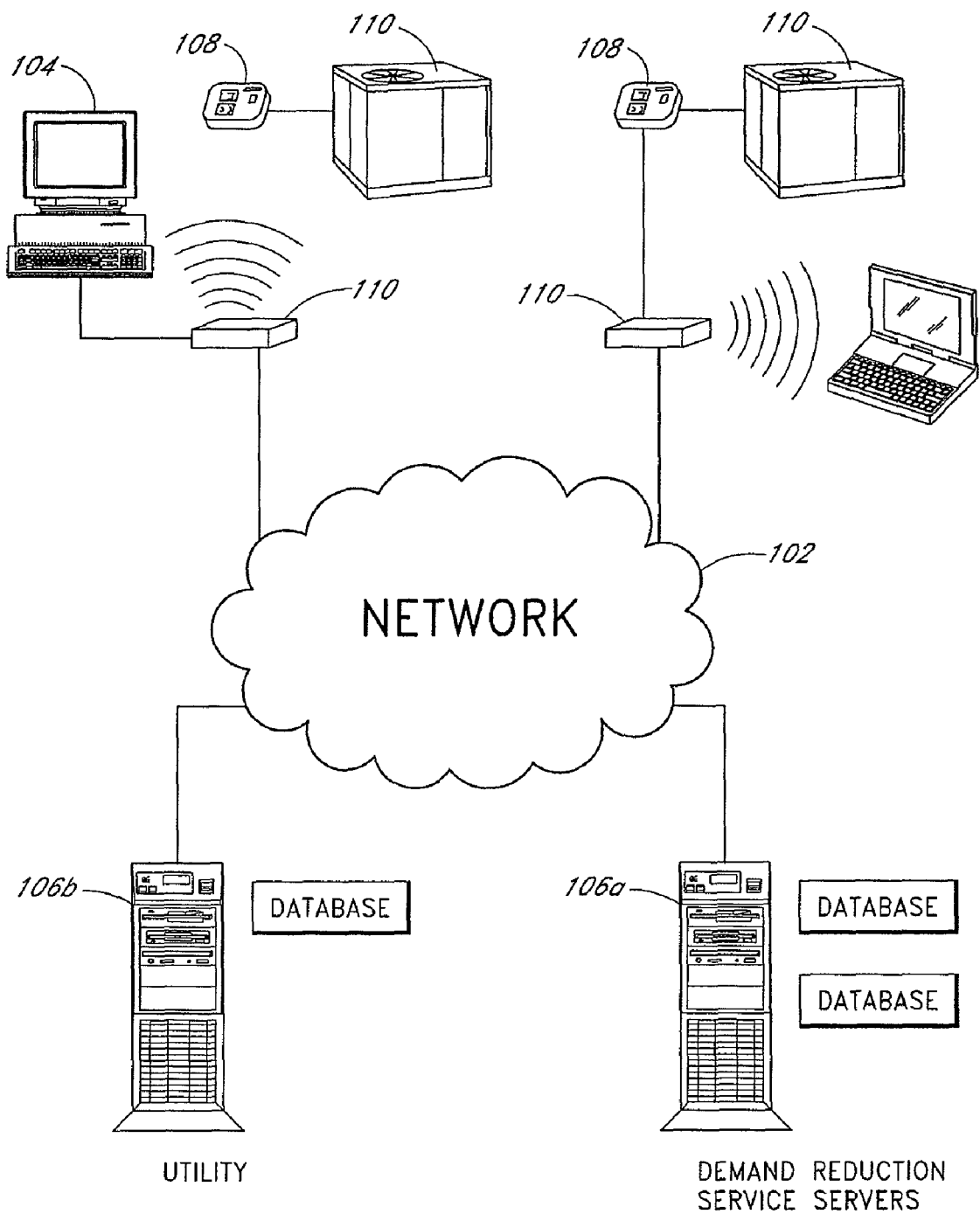
FIG. 2 shows a high-level illustration of the architecture of a network showing the relationship between the major elements of one embodiment of the subject invention.

FIG. 2 illustrates in further detail the architecture of the specific components connected to network 102 showing the relationship between the major elements of one embodiment of the subject invention. Attached to the network are thermostats 108 and computers 104 of various users. Connected to thermostats 108 are HVAC units 110. The HVAC units may be conventional air conditioners, heat pumps, or other devices for transferring heat into or out of a building. Each user is connected to the server 106 via wired or wireless connection such as Ethernet or a wireless protocol such as IEEE 802.11, a gateway 110 that connects the computer and thermostat to the Internet via a broadband connection such as a digital subscriber line (DSL) or other form of broadband connection to the World Wide Web. Server 106 contains the content to be served as web pages and viewed by computers 104, as well as databases containing information used by the servers.

Figure 3:
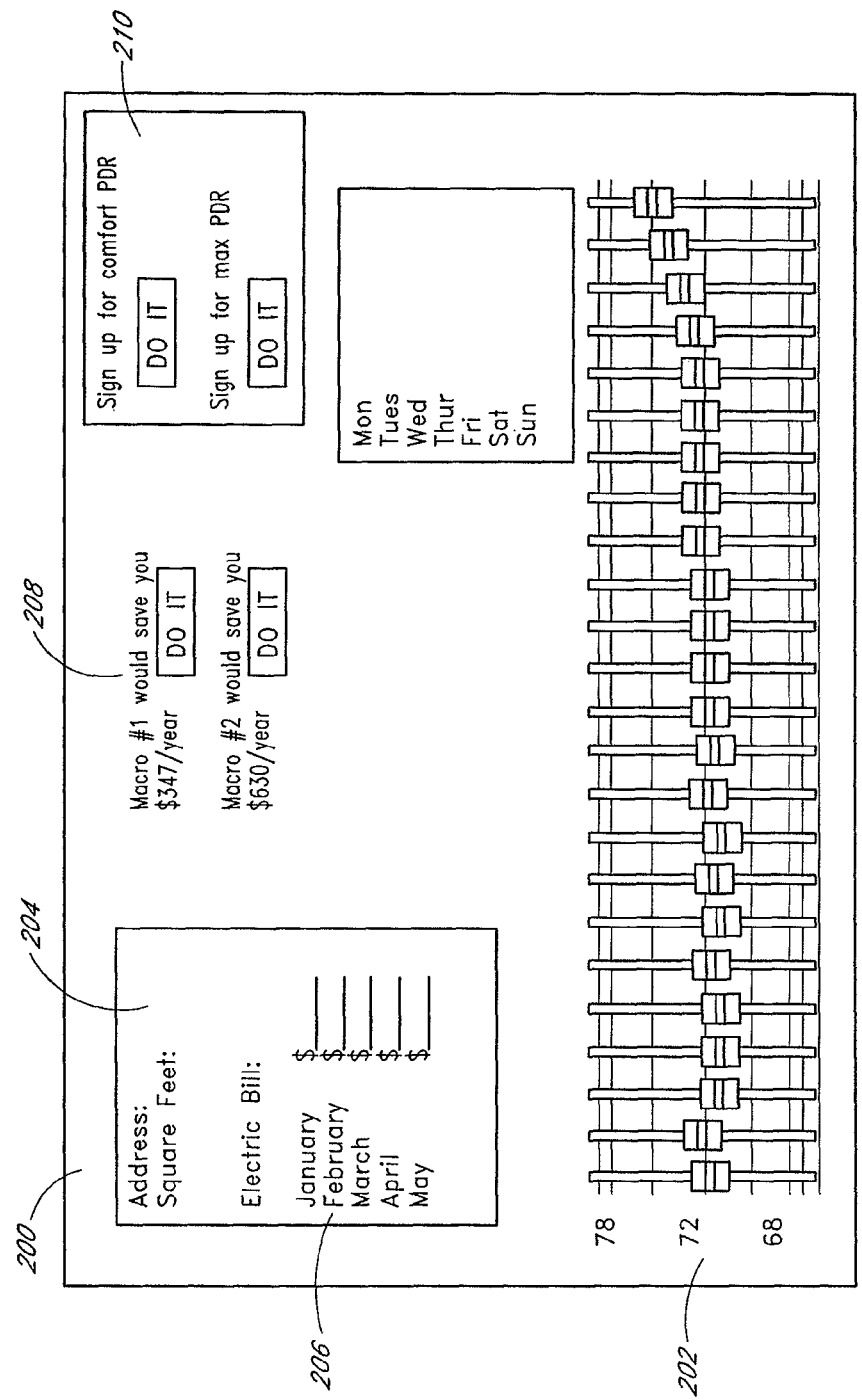
FIG. 3 shows an embodiment of the website to be used as part of the subject invention.

In the currently preferred embodiment, the website 200 includes a number of components accessible to the user, as shown in FIG. 3. Those components may include a means to enter temperature settings 202, a means to enter information about the user's home 204, a means to enter the user's electricity bills 206, means to calculate energy savings that could result from various thermostat-setting strategies 208, and means to enable and choose between various arrangements 210 for demand reduction with their electric utility provider as intermediated by the demand reduction service provider.

Figure 4:
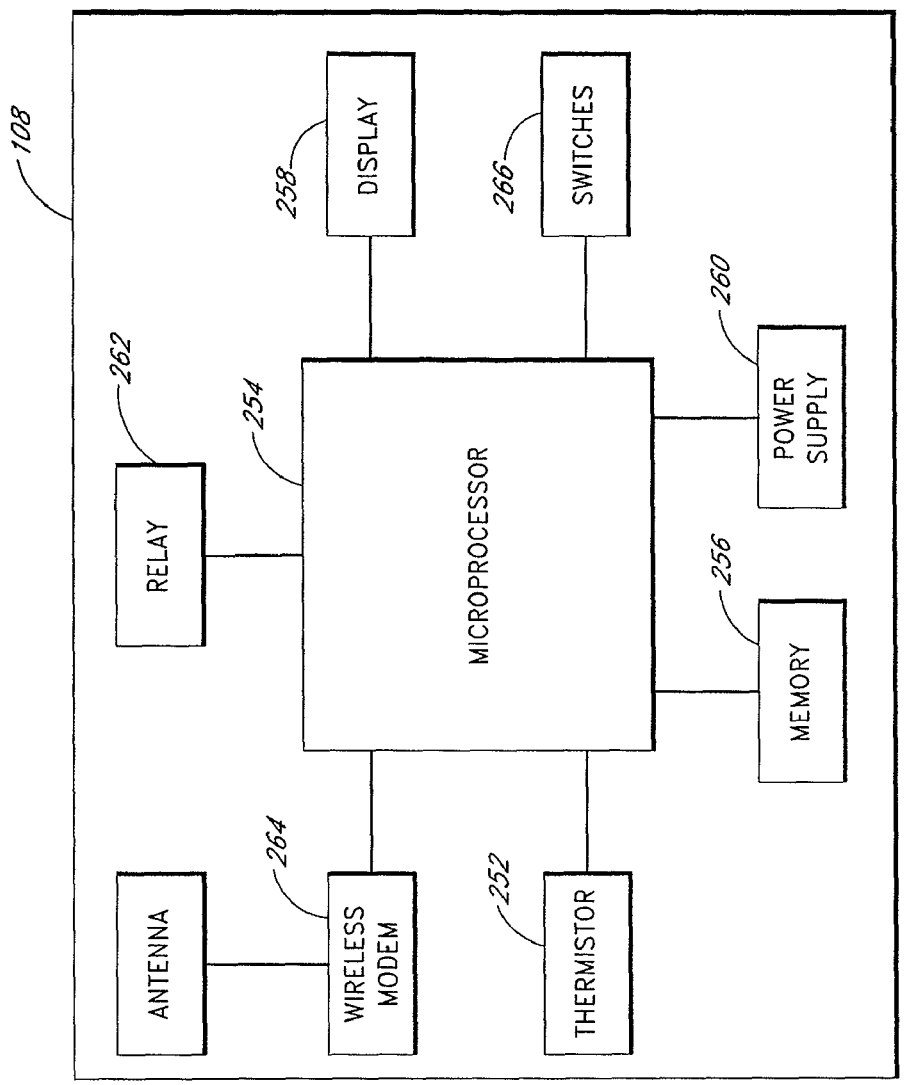
FIG. 4 shows a high-level schematic of the thermostat used as part of the subject invention.

FIG. 4 shows a high-level block diagram of thermostat 108 used as part of the subject invention. Thermostat 108 includes temperature sensing means 252, which may be a thermistor, thermal diode or other means commonly used in the design of electronic thermostats. It includes a microprocessor 254, memory 256, a display 258, a power source 260, a relay 262, which turns the HVAC system on and off in response to a signal from the microprocessor, and contacts by which the relay is connected to the wires that lead to the HVAC system. To allow the thermostat to communicate bi-directionally with the computer network, the thermostat also includes means 264 to connect the thermostat to a local computer or to a wireless network. Such means could be in the form of Ethernet, wireless protocols such as IEEE 802.11, IEEE 802.15.4, Bluetooth, cellular systems such as CDMA, GSM and GPRS, or other wireless protocols. The thermostat 250 may also include controls 266 allowing users to change settings directly at the thermostat, but such controls are not necessary to allow the thermostat to function.

Figure 5:
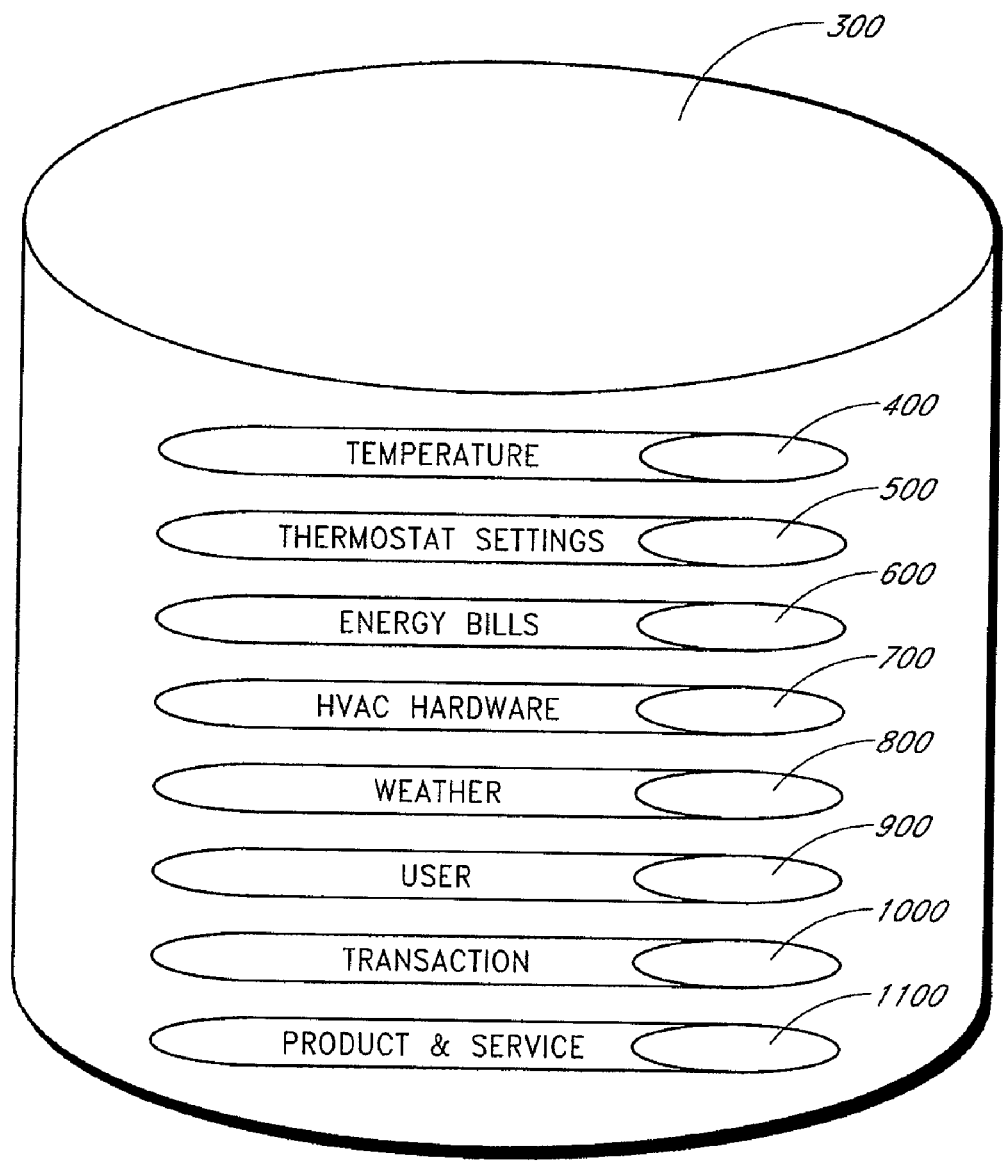
FIG. 5 shows one embodiment of the database structure used as part of the subject invention

The data used to generate the content delivered in the form of the website is stored on one or more servers 106 within one or more databases. As shown in FIG. 5, the overall database structure 300 may include temperature database 400, thermostat settings database 500, energy bill database 600, HVAC hardware database 700, weather database 800, user database 900, transaction database 1000, product and service database 1100 and such other databases as may be needed to support these and additional features.

The website will allow users of connected thermostats 250 to create personal accounts. Each user's account will store information in database 900, which tracks various attributes relative to users of the site. Such attributes may include the make and model of the specific HVAC equipment in the user's home; the age and square footage of the home, the solar orientation of the home, the location of the thermostat in the home, the user's preferred temperature settings, whether the user is a participant in a demand reduction program, etc.

As shown in FIG. 3, the website 200 will permit thermostat users to perform through the web browser substantially all of the programming functions traditionally performed directly at the physical thermostat, such as temperature set points, the time at which the thermostat should be at each set point, etc. Preferably the website will also allow users to accomplish more advanced tasks such as allow users to program in vacation settings for times when the HVAC system may be turned off or run at more economical settings, and set macros that will allow changing the settings of the temperature for all periods with a single gesture such as a mouse click.

In addition to using the system to allow better signaling and control of the HVAC system, which relies primarily on communication running from the server to the thermostat, the bi-directional communication will also allow the thermostat 108 to regularly measure and send to the server information about the temperature in the building. By comparing outside temperature, inside temperature, thermostat settings, cycling behavior of the HVAC system, and other variables, the system will be capable of numerous diagnostic and controlling functions beyond those of a standard thermostat.

Figure 6A:
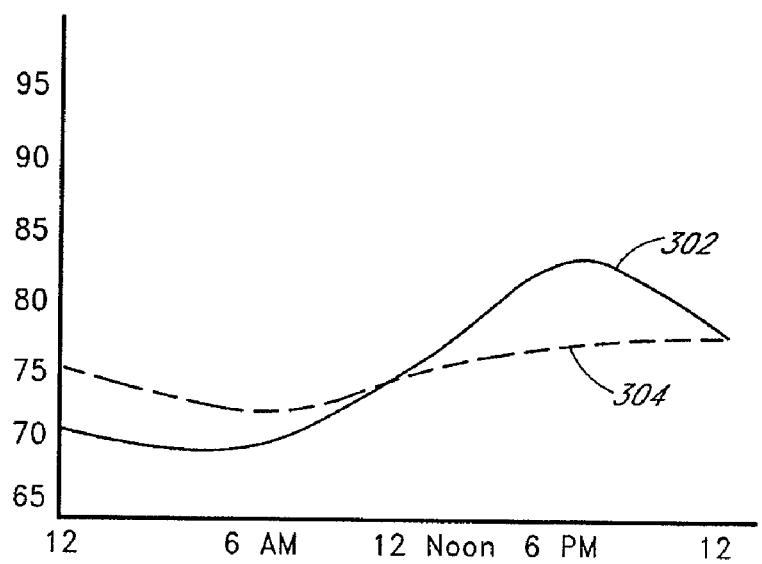
FIGS. 6a and 6b show graphical representations of inside and outside temperatures in two different homes, one with high thermal mass and one with low thermal mass.

For example, FIG. 6a shows a graph of inside temperature and outside temperature for a 24-hour period in House A, assuming no HVAC activity. House A has double-glazed windows and is well-insulated. When outside temperature 302 increases, inside temperature 304 follows, but with significant delay because of the thermal mass of the building.

Figure 6B:
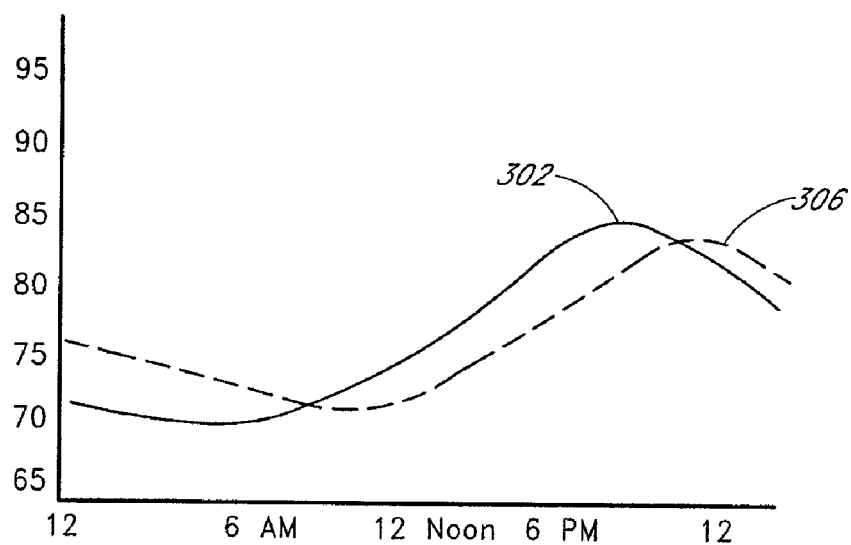

FIG. 6b shows a graph of inside temperature and outside temperature for the same 24-hour period in House B. House B is identical to House A except that it (i) is located a block away and (ii) has single-glazed windows and is poorly insulated. Because the two houses are so close to each other, outside temperature 302 is the same in FIG. 6a and FIG. 6b. But the lower thermal mass of House B means that the rate at which the inside temperature 306 changes in response to the changes in outside temperature is much greater.

Figure 7A:
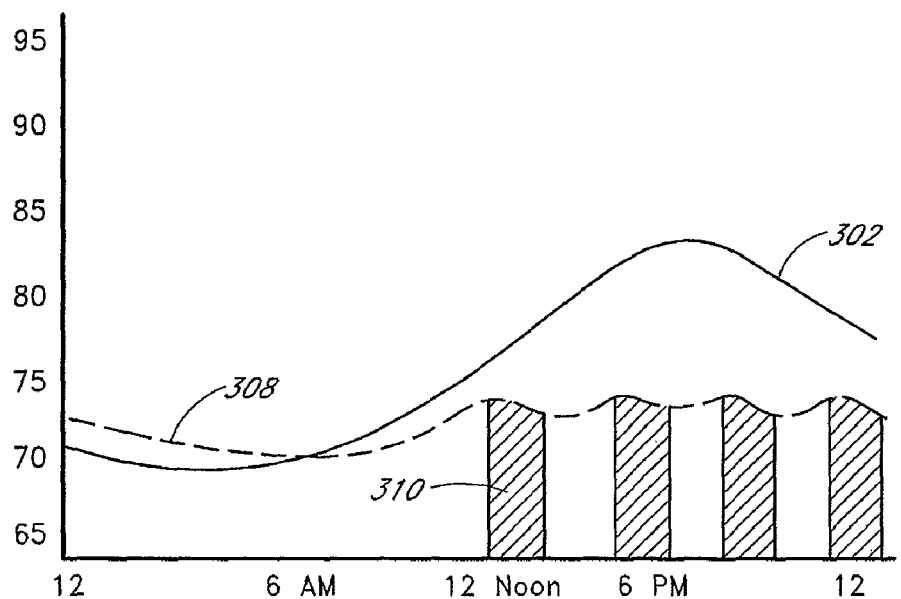
FIGS. 7a and 7b show graphical representations of inside and outside temperatures in the same homes as in FIGS. 6a and 6b, showing the cycling of the air conditioning systems in those houses.

The differences in thermal mass will affect the cycling behavior of the HVAC systems in the two houses as well. FIG. 7a shows a graph of inside temperature and outside temperature in House A for the same 24-hour period as shown in FIG. 6a, but assuming that the air conditioning is being used to try to maintain an internal temperature of 70 degrees. Outside temperatures 302 are the same as in FIGS. 6a and 6b. Because of the high thermal mass of the house, the air conditioning does not need to run for very long to maintain the target temperature, as shown by shaded areas 310.

Figure 7B:
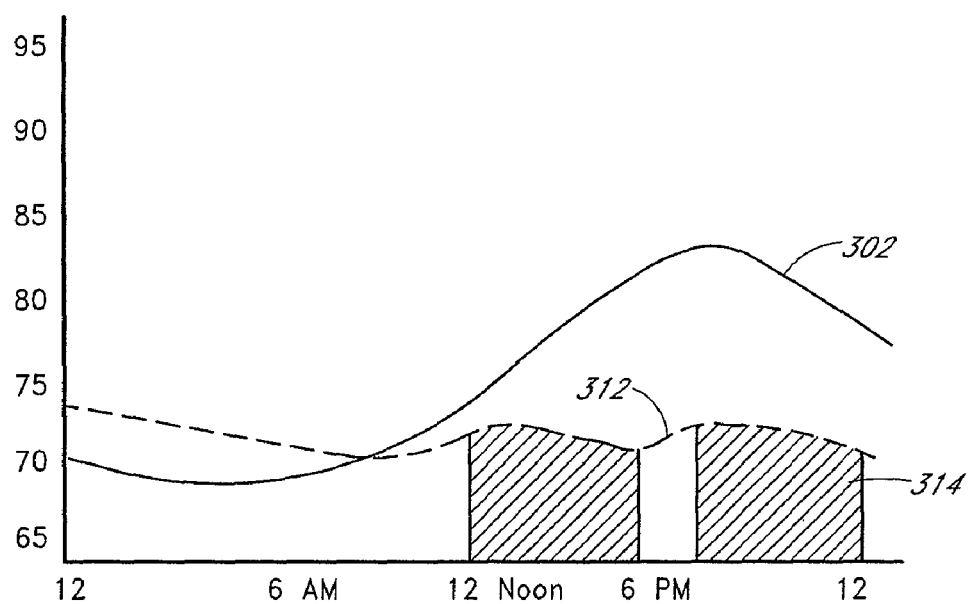

FIG. 7b shows a graph of inside temperature 312 and outside temperature 302 for the same 24-hour period in House B, assuming use of the air conditioning as in FIG. 7a. Because of the lower thermal mass of House B, the air conditioning system in House B has to run longer in order to maintain the same target temperature, as shown by shaded areas 314.

Because server 106a logs the temperature readings from inside each house (whether once per minute or over some other interval), as well as the timing and duration of air conditioning cycles, database 300 will contain a history of the thermal performance of each house. That performance data will allow the server 106a to calculate an effective thermal mass for each such structure—that is, the speed with the temperature inside a given building will change in response to changes in outside temperature and differences between inside and outside temperatures. Because the server will also log these inputs against other inputs including time of day, humidity, etc. the server will be able to predict, at any given time on any given day, the rate at which inside temperature should change for given inside and outside temperatures.

Figure 8A:
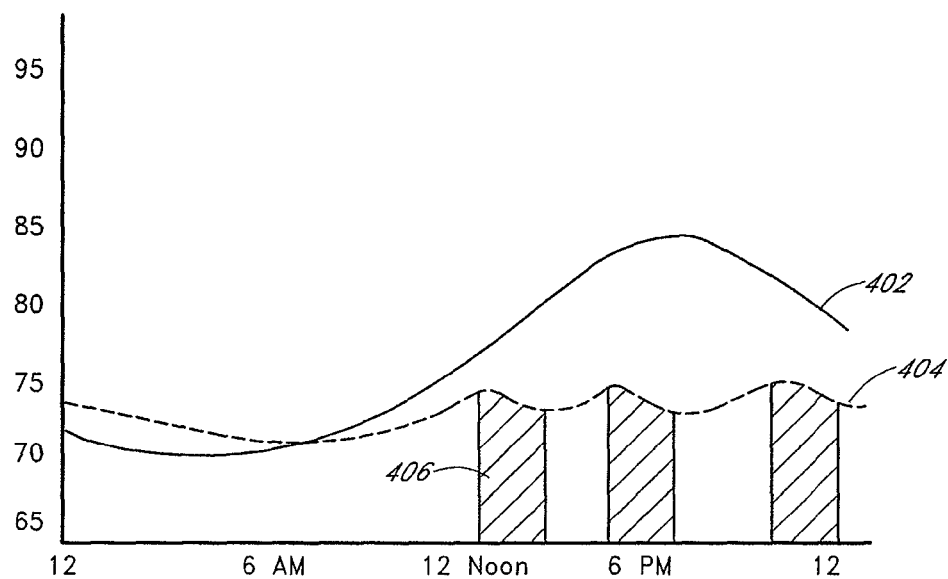
FIGS. 8a and 8b show graphical representations of inside and outside temperatures in the same home as in FIGS. 6a and 7a, showing the cycling of the air conditioning on two different days in order to demonstrate the effect of a change in operating efficiency on the parameters measured by the thermostat.
Figure 8B:
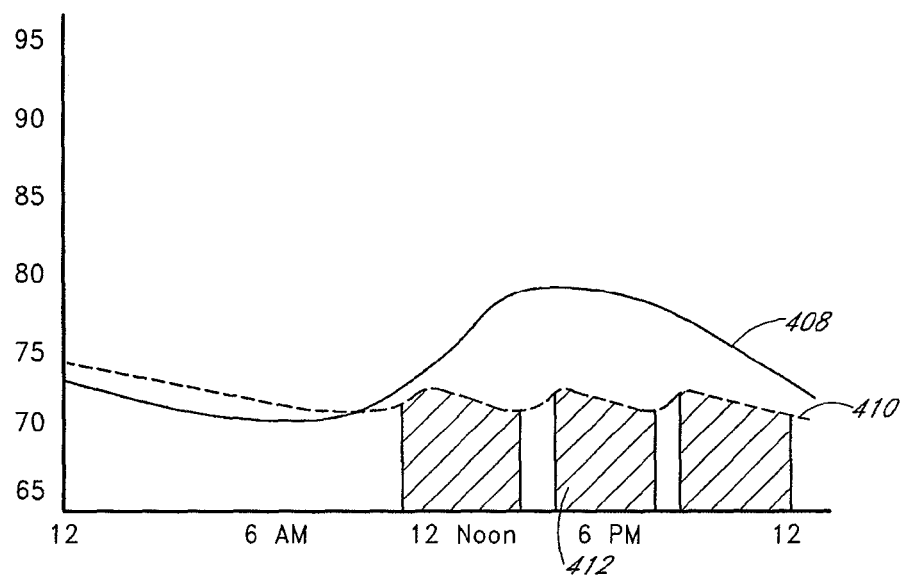

The server will also record the responses of each house to changes in outside conditions and cycling behavior over time. That will allow the server to diagnose problems as and when they develop. For example, FIG. 8a shows a graph of outside temperature 402, inside temperature 404 and HVAC cycle times 406 in House A for a specific 24-hour period on date X. Assume that, based upon comparison of the performance of House A on date X relative to House A's historical performance, and in comparison to the performance of House A relative to other nearby houses on date X, the HVAC system in House A is presumed to be operating at normal efficiency, and that House A is in the $86^{th}$ percentile as compared to those other houses. FIG. 8b shows a graph of outside temperature 408, inside temperature 410 and HVAC cycle times 412 in House A for the 24-hour period on date X+1. House A's HVAC system now requires significantly longer cycle times in order to try to maintain the same internal temperature. If those longer cycle times were due to higher outside temperatures, those cycle times would not indicate the existence of any problems. But because server 106 is aware of the outside temperature, the system can eliminate that possibility as an explanation for the higher cycle times. Because server 106 is aware of the cycle times in nearby houses, it can determine that, for example, on date X+1 the efficiency of House A is only in the $23^{rd}$ percentile. The server will be programmed with a series of heuristics, gathered from predictive models and past experience, correlating the drop in efficiency and the time interval over which it has occurred with different possible causes. For example, a 50% drop in efficiency in one day may be correlated with a refrigerant leak, especially if followed by a further drop in efficiency on the following day. A reduction of 10% over three months may be correlated with a clogged filter. Based upon the historical data recorded by the server, the server 106 will be able to alert the homeowner that there is a problem and suggest a possible cause.

Figure 9A:
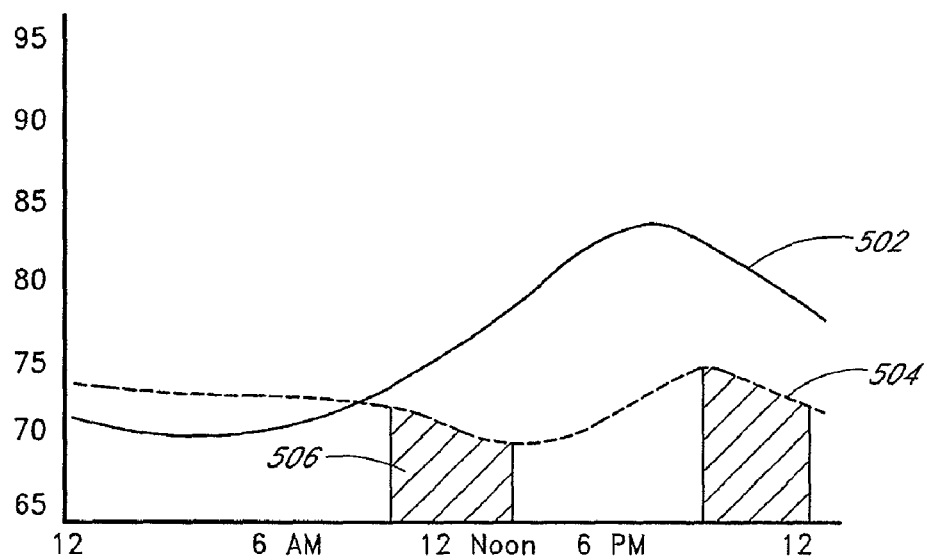
FIGS. 9a and 9b show the effects of employing a precooling strategy in two different houses.
Figure 9B:
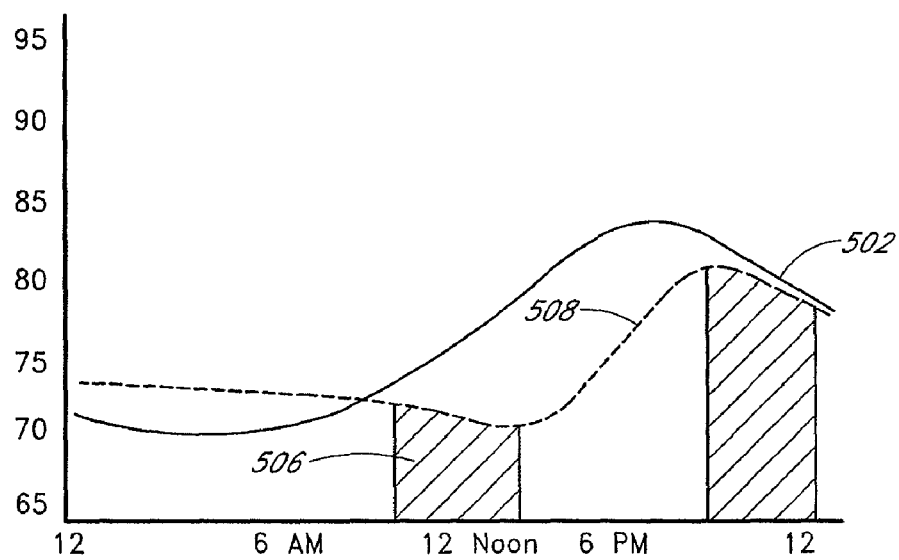

Because the system will be able to calculate effective thermal mass, it will be able to determine the cost effectiveness of strategies such as pre-cooling for specific houses under different conditions. FIG. 9a shows a graph of outside temperature 502, inside temperature 504 and HVAC cycling times 506 in House A for a specific 24-hour period on date Y assuming that the system has used a pre-cooling strategy to avoid running the air conditioning during the afternoon, when rates are highest. Because House A has high thermal mass, the house is capable of "banking" cool, and energy consumed during off-peak hours is in effect stored, allowing the house to remain cool even when the system is turned off. Temperatures keep rising during the period the air conditioning is off, but because thermal mass is high, the rate of increase is low, and the house is still comfortable six hours later. Although the pre-cooling cycle time is relatively long, the homeowner may still benefit because the price per kilowatt during the morning pre-cooling phase is lower than the price during the peak load period. FIG. 9b shows a graph of the same outside temperature 502 in House B as in House A in FIG. 9a for the same 24-hour period and using the same pre-cooling strategy as shown by cycling times 506. But because House B has minimal thermal mass, using additional electricity in order to pre-cool the house does not have the desired effect; inside temperature 508 warms up so fast that the cool that had been banked is quickly lost. Thus the system will recommend that House A pre-cool in order to save money, but not recommend pre-cooling for House B.

Figure 10A:
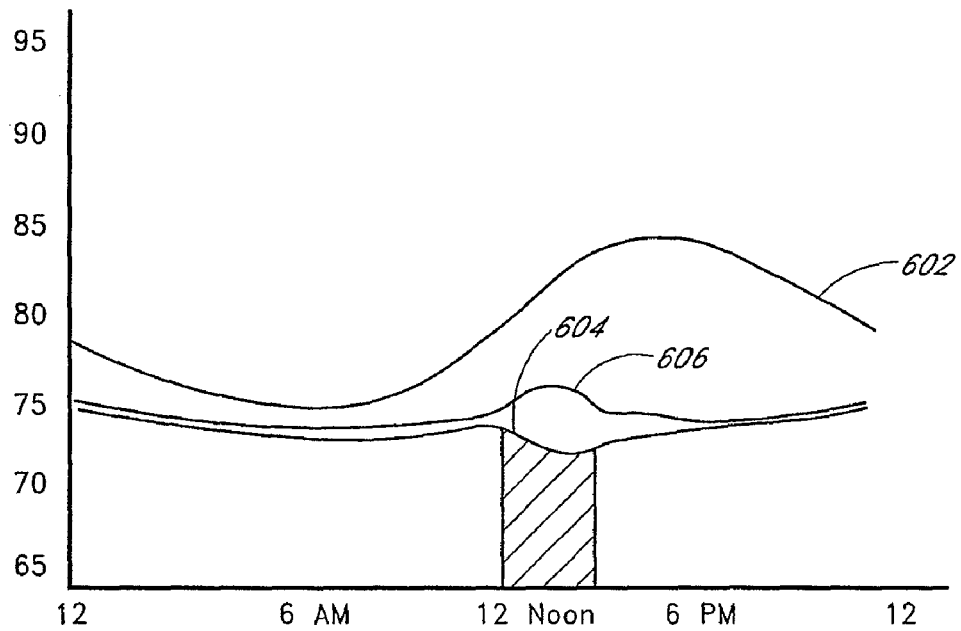
FIGS. 10a and 10b show graphical representations of inside and outside temperatures in two different homes in order to demonstrate how the system can correct for erroneous readings in one house by referencing readings in another.
Figure 10B:
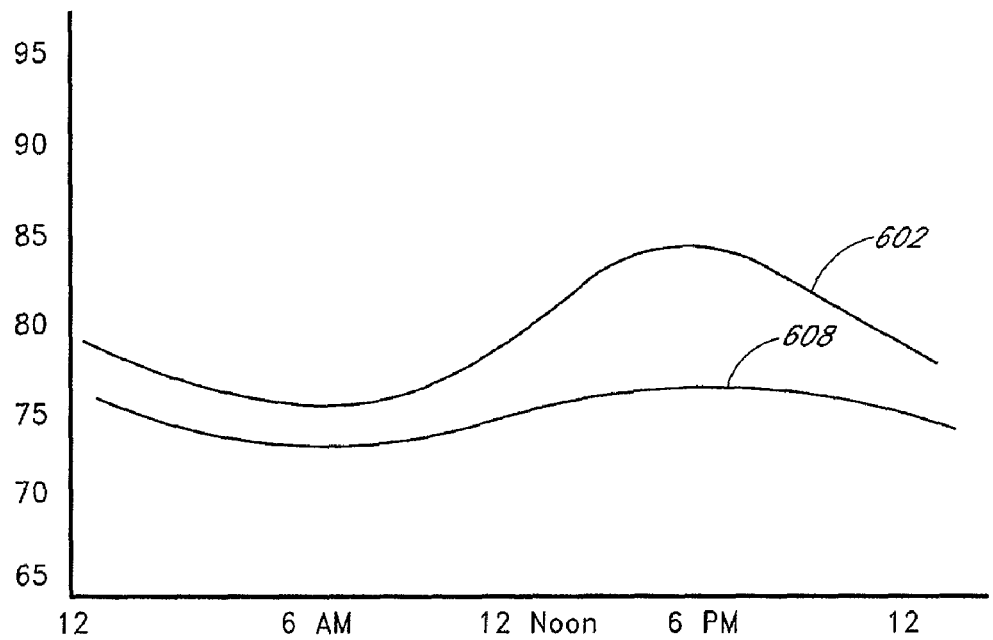

The system can also help compensate for anomalies such as measurement inaccuracies due to factors such as poor thermostat location. It is well-known that thermostats should be placed in a location that will be likely to experience "average" temperatures for the overall structure, and should be isolated from windows and other influences that could bias the temperatures they "see." But for various reasons, not all thermostat installations fir that ideal. FIG. 10a shows a graph of outside temperature 602, the average inside temperature for the entire house 604, and inside temperature as read by the thermostat 606 in House C for a specific 24-hour period on September $15^{th}$, assuming that the thermostat is located so that from 4 PM until 5:30 PM on that day the thermostat is in direct sunlight. Until the point at which the sun hits the thermostat, the average inside temperature and temperature as read by the thermostat track very closely. But when the direct sunlight hits the thermostat, the thermostat and the surrounding area can heat up, causing the internal temperature as read by the thermostat to diverge significantly from the average temperature for the rest of the house. Conventional thermostats have no way of distinguishing this circumstance from a genuinely hot day, and will both over-cool the rest of the house and waste considerable energy when it cycles the air conditioner in order to reduce the temperature as sensed by the thermostat. If the air conditioning is turned off, this phenomenon will manifest as a spike in temperature as measured by the thermostat. If the air conditioning is turned on (and has sufficient capacity to respond to the distorted temperature signal caused by the sunlight), this phenomenon will likely manifest as relatively small changes in the temperature as sensed by the thermostat, but significantly increased HVAC usage (as well as excessively lowered temperatures in the rest of the house, but this result may not be directly measured in a single sensor environment. The subject system, in contrast, has multiple mechanisms that will allow it to correct for such distortions. First, because the subject system compares the internal readings from House C with the external temperature, it will be obvious that the rise in temperature at 4:00 PM is not correlated with a corresponding change in outside temperature. Second, because the system is also monitoring the readings from the thermostat in nearby House D, which (as shown in FIG. 10b) is exposed to the same outside temperature 602, but has no sudden rise in measured internal temperature 608 at 4:00, the system has further validation that the temperature increase is not caused by climatic conditions. And finally, because the system has monitored and recorded the temperature readings from the thermostat in House C for each previous day, and has compared the changing times of the aberration with the progression of the sun, the system can distinguish the patterns likely to indicate solar overheating from other potential causes.

Figure 11:
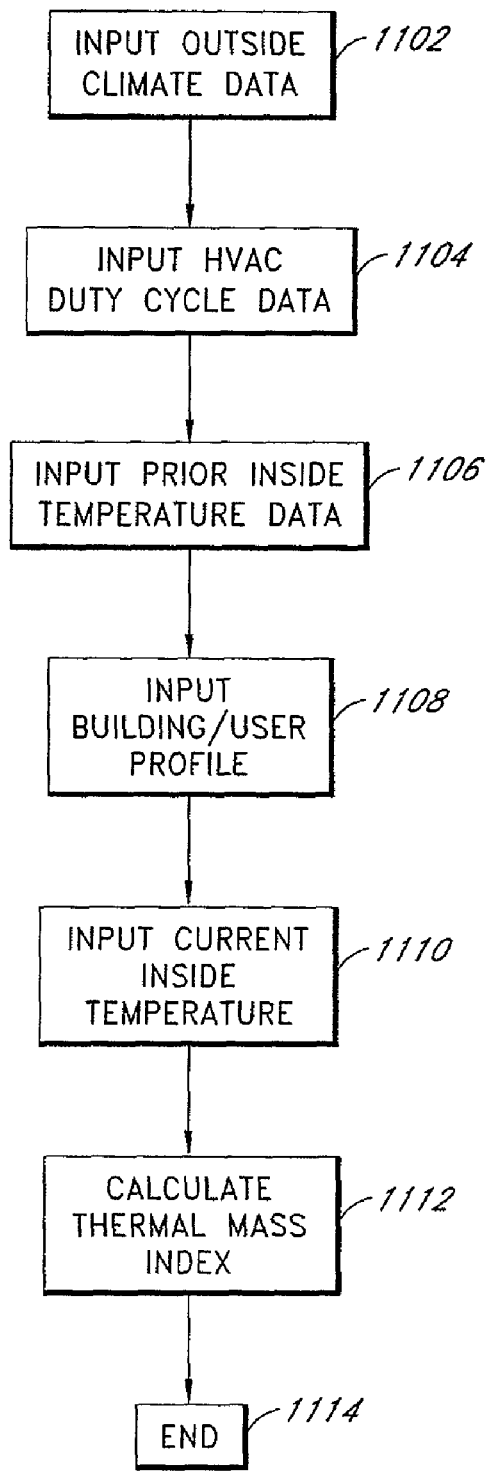
FIG. 11 is a flowchart illustrating the steps involved in calculating the effective thermal mass of a home using the subject invention.

FIG. 11 illustrates the steps involved in calculating comparative thermal mass, or the thermal mass index. In step 1102, the server retrieves climate data related to home X. Such data may include current outside temperature, outside temperature during the preceding hours, outside humidity, wind direction and speed, whether the sun is obscured by clouds, and other factors. In step 1104, the server retrieves HVAC duty cycle data for home X. Such data may include target settings set by the thermostat in current and previous periods, the timing of switch-on and switch-off events and other data. In step 1106, the server retrieves data regarding recent temperature readings as recorded by the thermostat in home X. In step 1108, the server retrieves profile data for home X. Such data may include square footage and number of floors, when the house was built and/or renovated, the extent to which it is insulated, its address, make, model and age of its furnace and air conditioning hardware, and other data. In step 1110, the server retrieves the current inside temperature reading as transmitted by the thermostat. In step 1112, the server calculates the thermal mass index for the home under those conditions; that is, for example, it calculates the likely rate of change for internal temperature in home X from a starting point of 70 degrees when the outside temperature is 85 degrees at 3:00 PM on August $10^{th}$ when the wind is blowing at 5 mph from the north and the sky is cloudy. The server accomplishes this by applying a basic algorithm that weighs each of these external variables as well as variables for various characteristics of the home itself (such as size, level of insulation, method of construction, etc.) and data from other houses and environments.

Figure 12:
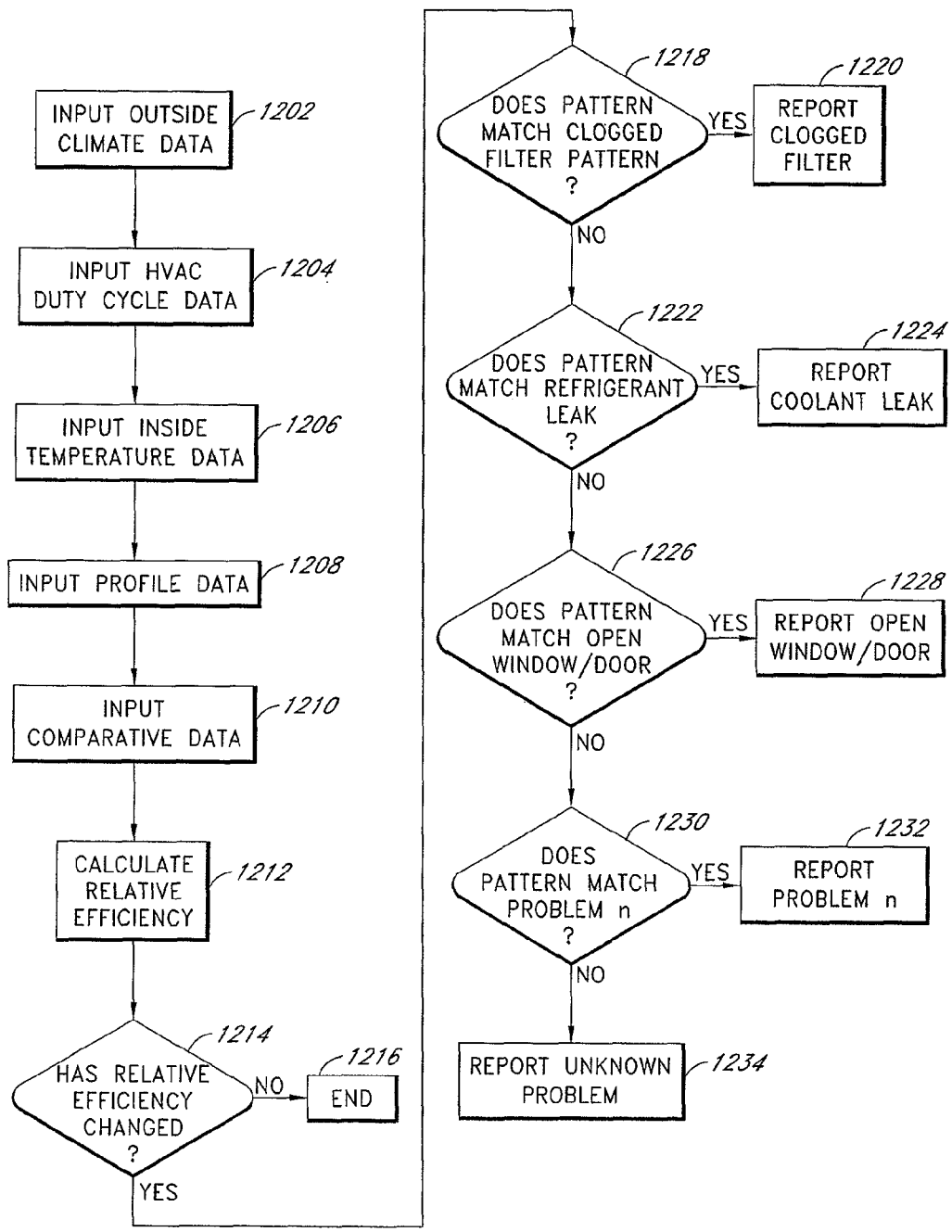
FIG. 12 is a flowchart illustrating the steps involved in determining whether an HVAC system has developed a problem that impairs efficiency using the subject invention.

FIG. 12 illustrates the steps involved in diagnosing defects in the HVAC system for specific home X. In step 1202, the server retrieves climate data related to home X. Such data may include current outside temperature, outside temperature during the preceding hours, outside humidity, wind direction and speed, whether the sun is obscured by clouds, and other factors. In step 1204, the server retrieves HVAC duty cycle data for home X. Such data may include target settings set by the thermostat in current and previous periods, the timing of switch-on and switch-off events and other data. In step 1206, the server retrieves data regarding current and recent temperature readings as recorded by the thermostat in home X. In step 1208, the server retrieves profile data for home X. Such data may include square footage and number of floors, when the house was built and/or renovated, the extent to which it is insulated, its address, make, model and age of its furnace and air conditioning hardware, and other data. In step 1210, the server retrieves comparative data from other houses that have thermostats that also report to the server. Such data may include interior temperature readings, outside temperature for those specific locations, duty cycle data for the HVAC systems at those locations, profile data for the structures and HVAC systems in those houses and the calculated thermal mass index for those other houses. In step 1212, the server calculates the current relative efficiency of home X as compared to other homes. Those comparisons will take into account differences in size, location, age, etc in making those comparisons.

The server will also take into account that relative efficiency is not absolute, but will vary depending on conditions. For example, a house that has extensive south-facing windows is likely to experience significant solar gain. On sunny winter days, that home will appear more efficient than on cloudy winter days. That same house will appear more efficient at times of day and year when trees or overhangs shade those windows than it will when summer sun reaches those windows. Thus the server will calculate efficiency under varying conditions.

In step 1214 the server compares the HVAC system's efficiency, corrected for the relevant conditions, to its efficiency in the past. If the current efficiency is substantially the same as the historical efficiency, the server concludes 1216 that there is no defect and the diagnostic routine ends. If the efficiency has changed, the server proceeds to compare the historical and current data against patterns of changes known to indicate specific problems. For example, in step 1218, the server compares that pattern of efficiency changes against the known pattern for a clogged air filter, which is likely to show a slow, gradual degradation over a period of weeks or even months. If the pattern of degradation matches the clogged filter paradigm, the server creates and transmits to the homeowner a message 1220 alerting the homeowner to the possible problem. If the problem does not match the clogged filter paradigm, the system compares 1222 the pattern to the known pattern for a refrigerant leak, which is likely to show a degradation over a period of a few hours to a few days. If the pattern of degradation matches the refrigerant leak paradigm, the server creates and transmits to the homeowner a message 1224 alerting the homeowner to the possible problem. If the problem does not match the refrigerant leak paradigm, the system compares 1226 the pattern to the known pattern for an open window or door, which is likely to show significant changes for relatively short periods at intervals uncorrelated with climatic patterns. If the pattern of degradation matches the open door/window paradigm, the server creates and transmits to the homeowner a message 1228 alerting the homeowner to the possible problem. If the problem does not match the refrigerant leak paradigm, the system continues to step through remaining know patterns N 1230 until either a pattern is matched 1232 or the list has been exhausted without a match 1234.

Figure 13:
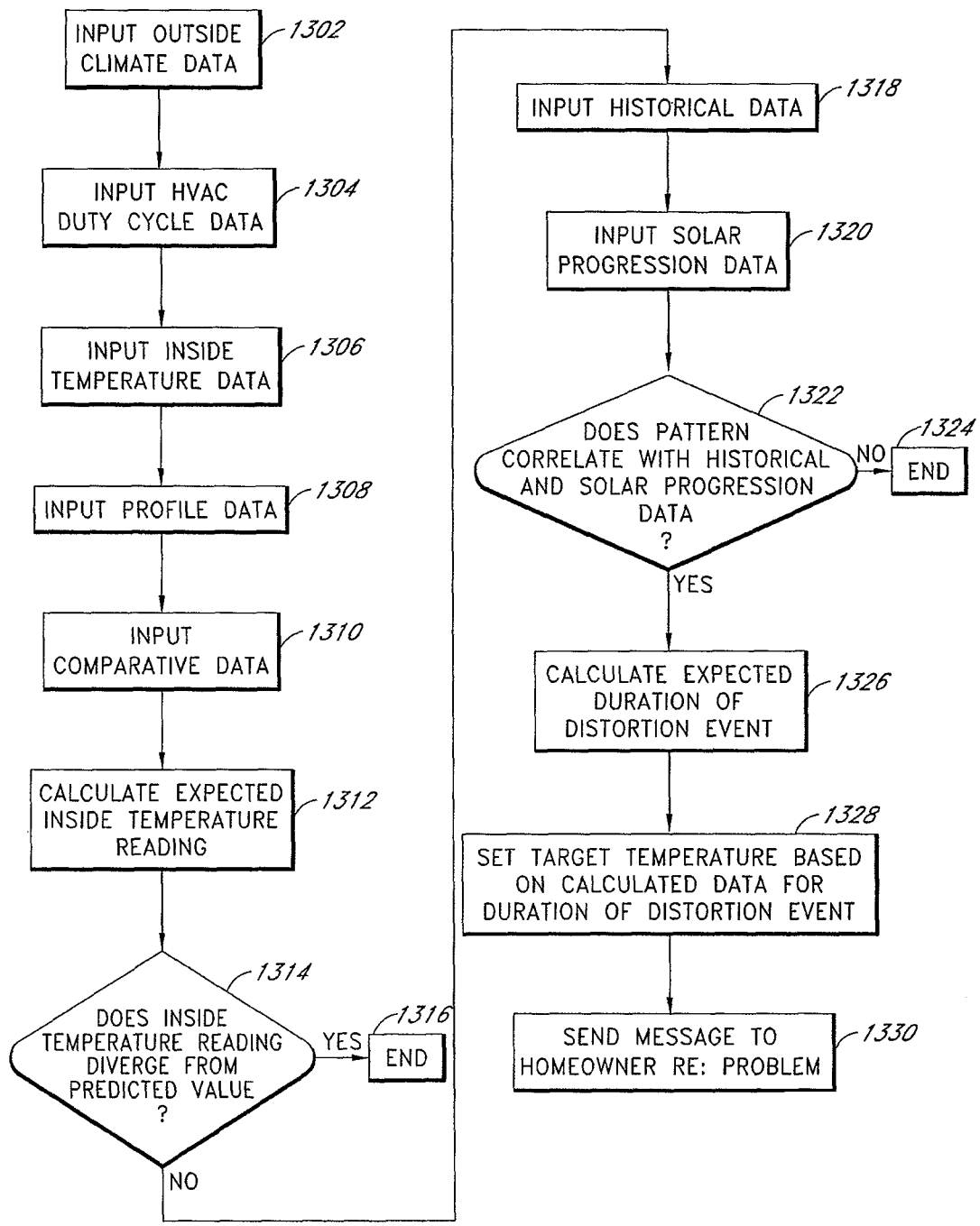
FIG. 13 is a flowchart illustrating the steps involved in correcting for erroneous readings in one house by referencing readings in another using the subject invention.

FIG. 13 illustrates the steps involved in diagnosing inaccurate thermostat readings due to improper location. In step 1302, the server retrieves climate data related to home X. Such data may include current outside temperature, outside temperature during the preceding hours, outside humidity, wind direction and speed, whether the sun is obscured by clouds, and other factors. In step 1304, the server retrieves HVAC duty cycle data for home X. Such data may include target settings set by the thermostat in current and previous periods, the timing of switch-on and switch-off events and other data. In step 1306, the server retrieves data regarding current and recent temperature readings as recorded by the thermostat in home X. In step 1308, the server retrieves profile data for home. X. Such data may include square footage and number of floors, when the house was built and/or renovated, the extent to which it is insulated, its address, make, model and age of its furnace and air conditioning hardware, and other data. In step 1310, the server retrieves comparative data from other houses that have thermostats that also report to the server. Such data may include interior temperature readings, outside temperature for those specific locations, duty cycle data for the HVAC systems at those locations, profile data for the structures and HVAC systems in those houses and the calculated thermal mass index for those other houses. In step 1312, the server calculates the expected thermostat temperature reading based upon the input data. In step 1314, the server compares the predicted and actual values. If the calculated and actual values are at least roughly equivalent, the server concludes 1316 that there is no thermostat-related anomaly. If the calculated and actual values are not roughly equivalent, the server retrieves additional historical information about past thermostat readings in step 1318. In step 1320, the server retrieves solar progression data, i.e., information regarding the times at which the sun rises and sets on the days being evaluated at the location of the house being evaluated, and the angle of the sun at that latitude, etc. In step 1322, the server compares the characteristics of the anomalies over time, to see if, for example, abnormally high readings began at 3:06 on June $5^{th}$, 3:09 on June $6^{th}$, 3:12 on June $7^{th}$, and the solar progression data suggests that at the house being analyzed, that sun would be likely to reach a given place in that house three minutes later on each of those days. If the thermostat readings do not correlate with the solar progression data, the server concludes 1324 that the sun is not causing the distortion by directly hitting the thermostat. If the thermostat readings do correlate with solar progression, the server then calculates 1326 the predicted duration of the distortion caused by the sun. In step 1328, the server calculates the appropriate setpoint information to be used by the thermostat to maintain the desired temperature and correct for the distortion for the expected length of the event. For example, if the uncorrected setpoint during the predicted event is 72 degrees, and the sun is expected to elevate the temperature reading by eight degrees, the server will instruct the thermostat to maintain a setpoint of 80 degrees. In step 1330, the server sends the homeowner a message describing the problem.

The system installed in a subscriber's home may optionally include additional temperature sensors at different locations within the building. These additional sensors may be connected to the rest of the system via a wireless system such as 802.11 or 802.15.4, or may be connected via wires. Additional temperature and/or humidity sensors may allow increased accuracy of the system, which can in turn increase user comfort or energy savings.

While particular embodiments have been shown and described, it is apparent that changes and modifications may be made without departing from the invention in its broader aspects and, therefore, the invention may carried out in other ways without departing from the true spirit and scope. These and other equivalents are intended to be covered by the following claims:

What is claimed is:

1. A system for calculating a value for the operational efficiency of a heating, ventilation, and air conditioning (HVAC) system comprising:
   at least one HVAC control system that receives temperature measurements from at least a first location conditioned by at least one HVAC system;
   one or more databases that store at least said temperatures measured at said first location over time; and
   one or more processors that receive outside temperature measurements from at least one source other than said HVAC system, wherein said one or more processors are configured to calculate one or more rates of change in temperature at said first location for periods during which the status of the HVAC system is "on" and wherein said one or more processors are further configured to calculate one or more rates of change in temperature at said first location for periods during which the status of the HVAC system is "off", and to relate said calculated rates of change to said outside temperature measurements.

2. A system as in claim 1 in which said processors receive outside temperatures for geographic regions based on ZIP codes from sources other than said HVAC system.

3. A system as in claim 1 further comprising a programmable thermostat that communicates with said HVAC control system using the Internet.

4. A system as in claim 1 in which said processors communicate with said HVAC system using a network that includes an electricity meter.

5. A system as in claim 1 further comprising a programmable thermostat and said programmable thermostat is the sole source for current data regarding temperature inside said location conditioned by said HVAC system.

6. A system as in claim 1 in which said temperature measurements inside said first location occur at only one physical location.

7. A method for calculating a value for the operational efficiency of an HVAC system that comprises:
   receiving temperature measurements from at least a first location conditioned by at least one HVAC system;
   storing in one or more databases at least said temperatures measured at said first location over time;
   receiving outside temperature measurements from at least one source other than said HVAC system; and
   calculating with one or more computer processors one or more rates of change in temperature at said first location for periods during which the status of the HVAC system is "on" and calculating one or more rates of change in temperature at said first location for periods during which the status of the HVAC system is "off", where said calculated rates of change are related to said outside temperature measurements.

8. A method as in claim 7 in which said outside temperatures are received for geographic regions based on ZIP codes from sources other than said HVAC system.

9. A method as in claim 7 where said temperature measurements from at least a first location conditioned by at least one HVAC system further are received from a programmable thermostat that communicates with said HVAC control system using the Internet.

10. A method as in claim 7 that includes receiving information about electricity consumption in said first location from an electricity meter.

11. A method as in claim 7 in which said data regarding temperature inside said location conditioned by said HVAC system is supplied by a programmable thermostat.

12. A method as in claim 7 in which said temperature measurements at said first location occur at only one physical location.

* * * * *